United States Patent Office 3,801,671
Patented Apr. 2, 1974

3,801,671
OXIDATIVE DEHYDROGENATION OF
ORGANIC COMPOUNDS
Robert M. Marsheck, Bartlesville, Okla., assignor to
Phillips Petroleum Company
No Drawing. Filed May 30, 1972, Ser. No. 258,068
Int. Cl. C07c 5/18
U.S. Cl. 260—680 E       5 Claims

ABSTRACT OF THE DISCLOSURE

The oxidative dehydrogenation of paraffinic hydrocarbons to diolefins can be improved by effecting such dehydrogenation in the presence of a fluidized mixed catalyst system consisting essentially of at least one catalyst active for the conversion of paraffins in admixture with at least one catalyst active for the conversion of monoolefins.

This invention relates to chemical processes. More particularly, this invention relates to the dehydrogenation of organic compounds, particularly hydrocarbon compounds, in the presence of oxygen.

The dehydrogenation of organic compounds is a well-known and widely-used method for converting saturated and partially saturated organic compounds to compounds having a greater degree of unsaturation. Dehydrogenation processes usually operate at rather severe conditions, particularly of temperature. While catalysts are not absolutely necessary, by far the vast majority of conversions of this type are catalytic in nature. The reaction is endothermic, thus requiring a large energy input, and is both thermodynamically and equilibrium limited. Considerable research effort has been expended to overcome these limitations. As a consequence, there have been developed exothermic reactions wherein oxygen is introduced into the reaction zone, primarily to burn the hydrogen which the processes generate. The energy liberated by the burning can provide at least part of the process heat requirements and, by continuously burning up the generated hydrogen, such burning tends to shift the equilibrium in the direction of greater feedstock conversions. However, one of the disadvantages of the oxidative systems is the tendency to also consume feedstock and/or product.

Such dehydrogenation processes are particularly useful for the conversion of saturated and partially saturated hydrocarbons to hydrocarbons having a higher degree of unsaturation. Representative of such processes are the conversion of butane to butenes and butadiene and the conversion of butenes to butadiene. Both types of catalytic processes, i.e., the conventional nonoxidative endothermic and the exothermic oxidative, have been employed with some measure of success for such conversions. In order to optimize the operation of such processes, not only in relation to conversion and yields but also in relation to product selectivity, catalyst effort has been directed to single catalyst systems which would provide the desired optimum results. This utopian ideal has not yet been discovered. These optimization studies have also resulted in the development of multistage dehydrogenation processes, wherein the original feedstock is sequentially contacted with a first catalyst having a particular composition in a first dehydrogenation zone, with at least a portion of the reaction effluent from the first dehydrogenation zone being contacted in a second dehydrogenation zone with a second catalyst having a different composition than the first, and so on. These multistage processes have been developed in a particular effort to increase the selectivity to, and yield of, diolefins in comparison to monoolefins. While commercially acceptable, these multistage processes leave much to be desired, not the least of which is the adverse economics introduced by the necessary serialization of at least two dehydrogenation reactors.

It is an object of this invention to provide a process for the dehydrogenation of paraffinic hydrocarbons, characterized by improved selectivity of conversion to diolefinic hydrocarbons.

It is another object of this invention to provide a single-stage process for producing diolefins from a hydrocarbon feedstock comprising at least one paraffinic hydrocarbon.

It is another object of this invention to provide novel catalyst systems particularly adapted for use in oxidative dehydrogenation processes.

Other objects, aspects and advantages of this invention will be readily apparent to those skilled in the art from the description and the appended claims.

The present invention provides a novel process for the conversion of organic feedstocks to products having a greater degree of unsaturation and which have the same or a lower number of carbon atoms per molecule as does the feedstock. According to this invention, an organic feedstock comprising a more saturated organic compound can be converted to products having a greater degree of unsaturation by contacting said feedstock under dehydrogenation conditions in the vapor phase in the presence of molecular oxygen with a mixed catalyst system consisting essentially of at least one catalyst selective to the conversion of saturates in admixture with at least one catalyst selective to the conversion of olefinically unsaturated organic compounds. The inventive process is particularly applicable to the conversion of hydrocarbons, especially for the production of diolefins from paraffins.

Thus, in accordance with the present invention, an organic feedstock having from 3 to 20 carbon atoms and at least one

grouping, can be dehydrogenated to organic compounds containing a greater degree of unsaturation by a process which comprises contacting said feedstock in the vapor phase under dehydrogenation conditions in the presence of molecular oxygen with a catalyst comprising an admixture consisting essentially of at least one first catalytic material which is active for the oxidative dehydrogenation of a saturated organic compound in combination with at least one second and different catalytic material which is active for the oxidative dehydrogenation of olefinically unsaturated organic compounds. The processes of the present invention are particularly applicable to the conversion of organic feedstocks comprising at least one paraffin hydrocarbon having from 3 to 20 carbon atoms and at least one pair of adjacent carbon atoms having at least one hydrogen atom on each carbon atom.

As noted, the catalyst systems which are applicable for use in the practice of this invention comprise an admixture consisting essentially of at least one of a first catalyst selected from the group consisting of catalysts which are active for the oxidative dehydrogenation of saturated organic compounds to mono- and/or polyunsaturated compounds and at least one of a second and different catalyst selected from the group consisting of catalysts which are active for the oxidative dehydrogenation of monoolefinically unsaturated organic compounds to polyunsaturated, preferably diolefinically unsaturated, organic compounds.

The paraffin-active catalysts, that is, those catalysts which exhibit substantial activity for the oxidative dehydrogenation of saturated organic compounds, can be selected from any suitable catalyst which has such activity. Such a catalyst can be functionally defined as one which, when contacted with a paraffin such as butane or isopentane under oxidative dehydrogenation conditions sufficient to effect about a 25 percent conversion, results in a selectivity to total monoolefin and diolefin products of at least 25 percent, preferably at least 40 percent. Although many paraffin-active catalysts produce significant amounts of diolefin products which can be presumed to be formed from monoolefin intermediates, the property which designates such a catalyst as a paraffin-active catalyst is its ability to substantially convert paraffins to unsaturated products even though it can simultaneously exhibit activity for converting monoolefins to diolefins.

Many paraffin-active catalysts are solid calcined compositions which comprise a mixture of suitable elements and combined oxygen. These are conveniently represented by a simple listing of the elements present without regard for the specific compounds which can be present. Some examples of such paraffin-active catalysts are:

| | | |
|---|---|---|
| Al/Co/P/O | Co/Fe/P/O | Co/Sn/O |
| As/Ir/Zn/O | Co/Fe/Sb/O | Co/W/O |
| As/Ni/Sn/O | Co/In/P/O | Fe/Ni/Sb/O |
| As/Ni/P/Sn/O | Co/Mg/O | K/Ni/P/Sn/O |
| Bi/Co/P/O | Co/Mg/Ni/P/O | Li/Ni/P/Sn/O |
| Ba/Co/P/O | Co/Mg/P/O | Mg/Ni/Sn/O |
| Ba/Ni/P/Sn/O | Co/P/O | Mg/Ni/S/O |
| Be/Co/P/O/ | Co/P/Pb/O | Ni/P/O |
| Bi/Sn/O | Co/P/Sn/O | Ni/P/Sn/O |
| Ca/Co/P/O | Co/P/Th/O | Ni/Sn/O |
| Cd/Co/P/O | Co/P/Y/O | | and the like, and mixtures thereof.

The elements in such calcined catalysts are present in proportions suitable for providing oxidative dehydrogenation activity and the catalysts are prepared so as to have a catalytic surface area of at least 1 m.$^2$/g. If desired, such catalyst compositions can be associated with conventional catalyst support materials such as silica, alumina, and the like.

A preferred class of paraffin dehydrogenation catalysts are the solid calcined catalysts comprising a catalytically active association of at least one metal selected from the group consisting of nickel, cobalt or iron; and at least one of tin or phosphorus. For simplicity, the nickel, cobalt, and iron group is herein referred to as the ferrous metals of Group VIII or merely as the ferrous metals. Optionally, such catalytically active associations can include one or more adjuvants as represented by the following:

Ferrous metal-tin-Groups I$a$, II$a$ and V$a$;
Ferrous metal-phosphorus-Groups I$a$-V$a$, I$b$, IV$b$, VI$b$, VII$b$ and rare earth metals; and
Ferrous metal-tin-phosphorus-Groups I$a$, II$a$ and V$a$ metals.

Especially preferred are catalytically active associations of at least one component selected from the group consisting of the ferrous metals; tin; phosphorus; such composition optionally containing at least one adjuvant selected from the group consisting of arsenic, antimony, bismuth, sulfur and alkali metal. Of these compositions, associations of at least one ferrous metal; tin; phosphorus; at least one component selected from the group consisting of antimony, arsenic and bismuth; and at least one alkali metal are particularly advantageous. The metals contained in the catalysts are not necessarily in the elemental state but can be combined with sufficient oxygen to form one or more compounds such as nickel stannate, cobalt phosphate, iron stannate, nickel oxide, iron oxide, potassium phosphate, sodium stannate, nickel arsenate, antimony oxide, bismuth nitrate, bismuth oxide, and the like, depending upon the proportions of the elements (metals) present. The presently preferred paraffin-active catalysts for use in the present invention comprise a catalytically active association of the following composition:

| Element | Weight percent | |
|---|---|---|
| | Broad | Preferred |
| Ferrous metal | 20–75 | 30–50 |
| Tin | 1–50 | 14–48 |
| Phosphorus | 0.5–10 | 2–6 |
| Arsenic, antimony, bismuth | 0–10 | 1–5 |
| Alkali metal | 0–6 | 1–4 |
| Sulfur | 0–6 | 1–5 |

The percentages shown above are based upon a total weight of the finished catalyst, and the difference between the total of the weights of the above-named elements and 100 percent is made up by its oxygen content in amounts sufficient to satisfy the valence requirements of the metals contained in the compositions. These preferred catalysts can be supported on or extended with conventional catalytic materials such as silica, alumina, boria, magnesia, titania, zirconia, and combinations thereof, such as silica-alumina, alumino-silicates and the like, as well as with other similar conventional support materials known in the art.

The olefin-active catalysts, that is, those catalysts which have substantial activity for oxidatively dehydrogenating unsaturated organic compounds can be selected from any suitable catalysts which possess such activity. A suitable catalyst can be one which, when contacted with a monoolefinic compound such as a butene or an isopentene under oxidative dehydrogenation conditions sufficient to effect about a 50 percent conversion, results in a selectivity to diolefinic products of at least 40 percent, preferably at least 80 percent.

Some examples of such olefin-active oxidative dehydrogenation catalysts are calcined compositions represented by:

| | | |
|---|---|---|
| Ag/P/Sn/O | Fe/Li/P/O | Mo/P/Ti/O |
| Al/Fe/P/O | Fe/P/O | Mo/Pb/Ti/O |
| Al/P/O | Fe/P/Re/O | Nd/P/O |
| Al/P/Sn/O | Fe/P/Sn/O | Ni/P/Sn/O |
| Al/Pb/Mo/W/O | Fe/P/Ti/O | Ni/Sn/W/O |
| Au/P/Sn/O | Fe/P/W/O | Os/P/Sn/O |
| B/Sn/P/O | Fe/Sn/O | P/Pd/Sn/O |
| Bi/P/Sn/O | Fe/Ti/O | P/Pt/Sn/O |
| Bi/Ti/W/O | Ga/P/Sn/O | P/Rh/Sn/O |
| Ca/Fe/P/O | Hg/P/Sn/O | P/Ru/Sn/O |
| Cd/P/Sn/O | In/P/Sn/O | P/Sn/O |
| Co/P/Sn/O | Ir/P/Sn/O | P/Sn/W/O |
| Co/Pb/Mo/W/O | La/P/Sn/O | P/Sn/Y/O |
| Cr/P/Sn/O | Li/P/Sn/O | P/Sn/Zn/O |
| Cu/P/Sn/O | Mo/Ni/P/O | P/U/O |
| Fe/Ga/P/O | Mo/Ni/Sb/O | P/V/O |
| Fe/K/P/O | Mo/P/Sn/O | | and the like, and mixtures thereof.

The elements in such calcined compositions are present in proportions suitable for providing the desired activity. They will generally have at least 1 m.$^2$/g. in surface area, and can be associated, if desired, with conventional catalyst support materials.

A preferred class of olefin dehydrogenation catalysts are the solid calcined catalysts comprising a catalytically active association of tin and phosphorus, preferably in combination with at least one adjuvant selected from the group consisting of Groups I$a$-III$a$ and V$a$ metals. Another such catalyst comprises a catalytically active association of titanium and a Group VI$b$ metal, preferably in combination with at least one adjuvant selected from the group consisting of IV$a$ and V$a$ metals. Presently preferred of the olefin-active catalysts are catalytically active associations comprising phosphorus; tin; and oxygen; preferably in combination with at least Group I$a$ or Group IIa metal. Such catalysts contain their components in proportions shown in the table below:

| Element | Weight percent | |
|---|---|---|
| | Broad | Preferred |
| Tin | 30-75 | 45-65 |
| Phosphorus | 0.1-16 | 2-12 |
| Group Ia or IIa metal, when present | 0.1-10 | 1-5 |

Each percentage is expressed as the element and is based on the total weight of the final catalyst composition. The amounts of the metallic components present in the final catalyst composition together total less than 100 percent based on the total weight of the catalyst composition the difference between the total weight and 100 percent being subsantially combined oxygen in an amount sufficient to satisfy the valence combining requirements of the tin, the phosphorus, and the Group Ia or IIa metal components.

The catalysts which are selected for use in forming the mixtures of the present invention can be prepared by conventional methods. For the sake of brevity, such preparatory methods will not be discussed herein.

As noted, the organic feedstocks which can be converted in accordance with the present invention comprise at least one dehydrogenatable organic compound having from 3 to 20 carbon atoms per molecule and at least one $$-\underset{|}{\overset{H}{\underset{|}{C}}}-\underset{|}{\overset{H}{\underset{|}{C}}}-$$

grouping, i.e., adjacent carbon atoms each having at least one hydrogen atom attached thereto. The present invention is particularly applicable to the conversion of hydrocarbon feedstocks containing from 3 to 20 carbon atoms, especially such feedstocks comprising at least one paraffinic hydrocarbon. The hydrocarbon feedstocks can be acyclic or cyclic as well as branched or unbranched. Particularly preferred feedstocks are the acyclic paraffins having from 4 to 12 carbon atoms. Representative hydrocarbon feedstocks include propane, butane, octane, decane, dodecane, pentadecane, hexadecane, octadecane, eicosane, and the like. The conversions of n-butane or isopentanes are particularly valuable.

In accordance with this invention, the mixed catalyst systems are employed in a fluidized bed reactor. The mixed catalyst systems are physical mixtures of individual discrete particles of each type of catalyst. The catalysts can be mixed by any conventional procedure for blending of physical mixtures and the admixture charged to the reactor. Regardless of the manner of such mixing, the mixed catalyst system is fluidized according to conventional techniques, preferably with a heated inert gas to bring the reactor to operating temperature before the vaporized feed stream is introduced into the reaction zone. In still another embodiment, the catalyst components can be fed individually or mixed into separate streams of inert gas and/or vaporized feedstock and the separate streams combined within the reaction zone, with the catalyst particles already being in the fluidized state.

Preferably, the individual particles of both catalyst types will have approximately the same density and will have a particle diameter ratio of less than about 2.5, preferentially less than about 1.5, and preferably will have a particle diameter ratio approaching unity. That is to say, the individual particles of the paraffin-active catalysts, when compared to each other, will exhibit the stated characteristics; the individual particles of the olefin-active catalysts, when compared to each other, will exhibit the stated characteristics; and the individual particles of paraffin-active catalysts, when compared to individual particles of olefin-active catalysts, will exhibit the stated characteristics. In addition, the particle size distribution of each type of catalyst should be substantially of the same order of magnitude, i.e., the overall particle size distribution of the paraffin-active catalyst should be approximately the same as the particle size distribution of the olefin-active catalysts, with catalysts having a larger mean particle size being presently preferred. Under these conditions, stratification of the catalyst charge will be at a minimum, with stratification increasing, especially at low gas velocities, as the particle diameter ratio exceeds the value of about 2.

The molecular oxygen-containing gas employed in accordance with the present invention can be present as such or with inert diluents such as nitrogen and the like. Suitable molecular oxygen-containing gases include air, flue gases containing residual oxygen, and any other conventional gas of a similar nature. Pure or substantially pure oxygen can also be employed if desired.

The operating conditions for the fluidized bed process of this invention can vary widely but will generally include a temperature from about 700° to about 1300° F., preferably from about 900° to about 1200° F.; a pressure in the range from about 0.05 to about 250, preferably from about 0.1 to about 50, p.s.i.a.; an oxygen:organic volume ratio of 0.1–1 to 3:1, preferably 0.5:1 to 2:1; and a steam:organic compound feed volume ratio in the range from about 0.1:1 to about 100:1, preferably 5:1 to about 30:1. In general, the linear fluid velocity will be in the range from about 0.1 to about 10, preferably about 0.3 to about 2.5, feet per second.

The process of this invention is ordinarily carried out by forming a mixture, preferably preheated, of organic compound, steam, and oxygen and/or oxygen-containing gases, and passing this mixture into the reaction zone and into contact with the already fluidized catalyst at the desired temperature. Recycle of unconverted organic compound feed can be employed if desired; however, the conversion rates and selectivity of this invention are generally sufficiently high to justify a single pass operation. Reaction contact time, i.e., the residence time of the increment of feed in the reaction zone, will normally be in the range of about 0.1 to about 10 seconds, preferably about 0.25 to about 2 seconds.

The catalysts of the invention can be used for long periods without reactivation. However, when and if the activation becomes necessary, it can be effected simply by discontinuing organic compound flow and allowing the flow of the other components of the feed mixture, i.e., the air and steam, to continue for a suitable regeneration time or until the activity is substantially restored.

The following examples will serve to further illustrate the invention.

EXAMPLE I

A mixture of n-butane, air and steam was preheated and fed to a tubular fluidized bed reactor containing a nickel-tin-phosphorus-oxygen catalyst. A sample of the effluent was taken after 3 hours of continuous on-stream operation and analyzed by gas-liquid chromatography. The results, together with the reaction conditions, are shown in Table I below.

TABLE I

Fluid Bed Oxidative Dehydrogenation of n-Butane

Reaction conditions

| | |
|---|---|
| Catalyst | Ni/Sn/P/O |
| Temperature °F | 1100 |
| Oxygen:n-butane mole ratio | 1.1:1 |
| Steam:n-butane mole ratio | 16:1 |
| Velocity f.p.s | 1 |
| Pressure p.s.i.g | 5 |
| Bed depth in | 4 |

Test results

| | |
|---|---|
| Conversion, mole percent | 42.2 |
| Yield, mole percent butadiene | 10.9 |
| Gas phase selectivity [a], mole percent: | |
| Butadiene | 25.9 |
| Butenes | 24.7 |
| Butadiene: butene molar ratio Ca | 1:1 |

[a] Modified selectivity based on analysis of gas phase product for converted hydrocarbons, carbon oxides and unconverted feed.

EXAMPLE II

A mixture of n-butane, steam and air was preheated and fed to a tubular fluidized bed reactor containing an equal weight mixture of a catalyst having the same composition as that employed in Example I and a tin-phosphorous-lithium-oxygen catalyst. After 3 hours of continuous on-stream operation, a sample of the effluent was taken and analyzed by gas-liquid chromatography. The results, together with reaction conditions, are shown in Table II below.

TABLE II

Oxidative Dehydrogenation of n-Butane

Reaction conditions

| | |
|---|---|
| Catalyst | (a) |
| Temperature °F | 1100 |
| Oxygen:n-butane mole ratio | 1.1:1 |
| Steam:n-butane mole ratio | 16:1 |
| Velocity f.p.s | 1 |
| Pressure p.s.i.g | 5 |
| Bed depth in | 4 |

Test results

| | |
|---|---|
| Conversion, mole percent | 35.6 |
| Yield, mole percent butadiene | 15.2 |
| Gas phase selectivity,(b) mole percent: | |
| Butadiene | 42.6 |
| Butenes | 7.0 |
| Butadiene:butenes molar ratio Ca. | 6:1 | a An equal weight mixture of (1) Ni/Sn/P/O and (2) Sn/P/Li/O.
b Modified selectivity based on analysis of gas phase products for converted hydrocarbons, carbon oxides and unconverted feeds.

The data of Examples I and II demonstrate that, even though the level of conversion was lower, the diolefin production was significantly increased by the practice of this invention. It is expected that, with an increase in dehydrogenation reaction temperature whereby the conversion level were increased, the yield of butadiene would be further increased. In these examples the compositions of the catalysts were as follows:

Paraffin-active catalyst: 46% nickel; 10% tin; 5% phosphorous; 2% potassium; 5% sulfur; and 32% oxygen.
Olefin-active catalyst: 5% tin; 10% phosphorus; 2% lithium; and 30% oxygen.

The size distribution of both types of catalysts was as follows:

| Mesh (U.S.) | Percent | Mesh (U.S.) | Percent | Mesh (U.S.) | Percent |
|---|---|---|---|---|---|
| 30-35 | 3 | 45-50 | 18 | 70-80 | 12 |
| 35-40 | 7 | 50-60 | 20 | 80-100 | 7 |
| 40-45 | 12 | 60-70 | 18 | 100-120 | 3 |

Reasonable variations and modifications are possible within the scope of this disclosure without departing from the spirit and scope thereof.

I claim:

1. A process for the dehydrogenation of a hydrocarbon feedstock having from 3 to 20 carbon atoms and at least one

grouping, which comprises contacting said feedstock under dehydrogenation conditions in the presence of steam and molecular oxygen and a fluidized catalyst system containing an admixture of at least one first catalyst active for the oxidative dehydrogenation of paraffinic hydrocarbons and at least one second catalyst active for the oxidative dehydrogenation of monoolefinically unsaturated hydrocarbons, wherein said first catalyst is selected from the group of catalytically active associations characterized by the composition from about 20 to about 75 weight percent of at least one ferrous metal selected from the group consisting of cobalt, nickel and iron;
from about 1 to about 50 weight percent of tin;
from about 0.5 to about 10 weight percent phosphorus;
from 0 to about 10 weight percent of at least one component selected from the group consisting of arsenic, antimony and bismuth;
from 0 to about 6 weight percent of at least one alkali metal; and
from 0 to about 6 weight percent of sulfur;
said composition containing oxygen in an amount sufficient to satisfy the valence requirements of the metals contained in such composition; and
wherein said second catalyst is selected from the group of catalytically active associations characterized by the composition from about 30 to about 75 weight percent of tin;
from about 0.1 to about 16 weight percent of phosphorus; and
from 0 to about 10 weight percent of at least one adjuvant selected from the group consisting of Groups Ia and IIa metals;

said composition containing oxygen in an amount sufficient to satisfy the valence requirements of the metals contained in such composition.

2. A process according to claim 1 wherein said feedstock comprises at least one paraffinic hydrocarbon.

3. A process according to claim 1 wherein said first catalyst is a catalytically active association of nickel-tin-phosphorus-oxygen-Group Ia metal-sulfur; and said second catalyst is a catalytically active association of tin-phosphorus-oxygen-Group Ia metal.

4. A process according to claim 3 wherein said first catalyst consists essentially of nickel-tin-phosphorus-potassium-sulfur and oxygen, and said second catalyst consists essentially of tin-phosphorus-lithium and oxygen.

5. A process according to claim 1 wherein said first catalyst is a catalytically active association of from about 30 to about 50 weight percent of at least one ferrous metal selected from the group consisting of cobalt, nickel and iron;
from about 14 to about 48 weight percent tin;
from about 2 to about 6 weight percent phosphorus;
from about 1 to about 4 weight percent of at least one alkali metal; and
from about 1 to about 5 weight percent of sulfur;
and said second catalyst is a catalytically active association of from about 45 to about 65 weight percent tin;
from about 2 to about 12 weight percent phosphorus; and
from about 1 to about 5 weight percent of at least one alkali metal;

wherein said first and second catalysts each contain oxygen in an amount sufficient to satisfy the valence requirements of the metals contained in such catalysts.

References Cited

UNITED STATES PATENTS

| | | | |
|---|---|---|---|
| 3,644,550 | 2/1972 | Beuther et al. | 260—673 |
| 3,370,103 | 2/1968 | Callahan et al. | 260—680 E |
| 3,320,331 | 5/1967 | Gaspar et al. | 260—680 E |
| 3,660,513 | 5/1972 | Davison | 260—680 E |

PAUL M. COUGHLAN, JR., Primary Examiner

U.S. Cl. X.R.

252—437; 260—683.3